United States Patent [19]

Croisier et al.

[11] 4,142,071
[45] Feb. 27, 1979

[54] QUANTIZING PROCESS WITH DYNAMIC ALLOCATION OF THE AVAILABLE BIT RESOURCES AND DEVICE FOR IMPLEMENTING SAID PROCESS

[75] Inventors: Alain Croisier, Larchmont, N.Y.; Daniel Esteban; Claude Galand, both of LaGaude, France

[73] Assignee: International Business Machines Corporation, Armonk, N.Y.

[21] Appl. No.: 895,204

[22] Filed: Apr. 10, 1978

[30] Foreign Application Priority Data

Apr. 29, 1977 [FR] France .................................. 77 13995

[51] Int. Cl.² .................. H04J 6/02; H03K 13/01
[52] U.S. Cl. .................. 179/15.55 R; 179/15 BW; 179/1 SA
[58] Field of Search ............. 179/15 BW, 15.55 R, 179/1 SA; 325/38 R; 332/11 D

[56] References Cited

U.S. PATENT DOCUMENTS 2,495,739  1/1950  Labin et al. .................... 179/15 BW
4,048,443  9/1977  Crochiere et al. ............ 179/15.55 R

FOREIGN PATENT DOCUMENTS 1338723  11/1973  United Kingdom ............. 179/15.55 R

OTHER PUBLICATIONS

A. Croisier, "Progress in PCM and Delta Modulation", Int'l Seminar on Digital Comm., Zurich, 1974.
R. E. Crochiere, "Digital Coding of Speech in Sub-Bands", BSTJ, Oct. 1976, pp. 1069-1085.

Primary Examiner—Kathleen H. Claffy
Assistant Examiner—E. S. Kemeny
Attorney, Agent, or Firm—John B. Frisone

[57] ABSTRACT

A coding process, given a total number of available bits per unit time, allocates to each of a plurality of signal channels a number of bits proportional to information in the channel. The process is useful for transcoding BCPCM (Block Coded PCM) voice signals for lower bit rate and conserving transmission channel bandwidth.

12 Claims, 5 Drawing Figures

DECOMPOSITION RECONSTITUTION

QUANTIZING PROCESS WITH DYNAMIC ALLOCATION OF THE AVAILABLE BIT RESOURCES AND DEVICE FOR IMPLEMENTING SAID PROCESS

FIELD OF THE INVENTION

This invention relates to digital techniques for coding a time-sampled signal, and improving the quantizing signal-to-noise ratio.

The translation of a time-varying signal into digital code is performed by sampling said signal and by quantizing the samples. This involves a preliminary partition of the continuous scale used to measure the signal amplitudes, into sections, and the assignment of a single digital value to each of said sections. When the signal quantizing operation is carried out, all the samples, the amplitude of which lay within the limits of a given section, are coded with the same digital value. Of course, this results in an incorrect transcription involving an error between the original signal and its coded form. Then, it is said that the operations which are carried out, generate a quantizing noise. It is obvious that narrowing the sections will result in a reduction of the noise. However, within the limits of given amplitude variations, this operation would increase the number of sections; therefore, the number of digital values used for coding them, and consequently the number of bits to be used to generate a digital definition of the sections. This results in a higher complexity of the devices to be provided for processing the signal expressed in digital mode, and as the case may be, in an increase in the signal transmission requirements. Therefore, it is desirable to reduce the number of bits used in the coding operation while retaining a usable signal-to-noise ratio. Or, conversely, the overall bit resources allocated to the quantization being fixed, it is desirable to ensure a rational use of said bit resources in order to reduce the noise to a minimum value.

These requirements are at the origin of the so-called "delta PCM" coding processes in which the quantizing bits are used for coding the signal increments between two consecutive sampling instants and not for coding the whole amplitude of each sample. The swing of the information to be quantized being much less, a better use of the quantizing bit resources is ensured since the measurement scale may then be partitioned into narrower sections.

The early processes were later improved by taking the statistical characteristics of the signal to be coded into account. For instance, since it appears that the energy of the vocal originated signals is generally concentrated in the low frequency zones of the voice spectrum, it was proposed to allocate more bits to the quantization of these zones, thus, coding these signals with a greater degree of accuracy than the signals located in the higher frequency bands. An example of an embodiment of this type may be found in the article by Crouchiere et al. published in the *Bell System Technical Journal*, October, 1976. In the process disclosed therein, the vocal signal is first filtered by a bank of adjacent band-pass filters covering the whole telephone range. The resulting signal bandwidths are then folded back into the base-band by modulation, and then sampled at their Nyquist frequency. Each signal (or sub-band) is quantized in a non-uniform manner, i.e., by allocating more bits to the lower bands than to the higher bands. But this implies a certain invariability of the spectral characteristics of the type of signal to be coded, which is the case when only signals expressing the human voice are processed. In spite of certain differences between speakers, a statistical study permits quantizing bit rates to be chosen and their appropriate distribution into the sub-bands to be defined.

Unfortunately, specializing the coder for only one type of signal involves obvious drawbacks. Namely, this is the case when one has to process, using a specialized coder, voice signals and signals resulting from the combinations of digital data the spectrum of which, while located in the same frequency band as the voice, shows a different energy distribution.

OBJECTS OF THE INVENTION

An object of this invention is to provide a sub-band coding process in which a signal, the energy of which is randomly distributed between the various sub-bands, is quantized in an efficient manner.

Another object of this invention is to provide a process for coding a signal by blocks of samples, by splitting the signal spectrum into frequency sub-bands and by dynamically distributing the available coding bit resources among said sub-bands.

Another object of this invention is to provide a process using a small number of bits for recoding a signal initially coded with a larger number of bits.

These and other objects, advantages and features of the present invention will become more readily apparent from the following specification when taken in conjunction with the drawings.

DESCRIPTION OF THE PREFERRED EMBODIMENT

Figure 1:
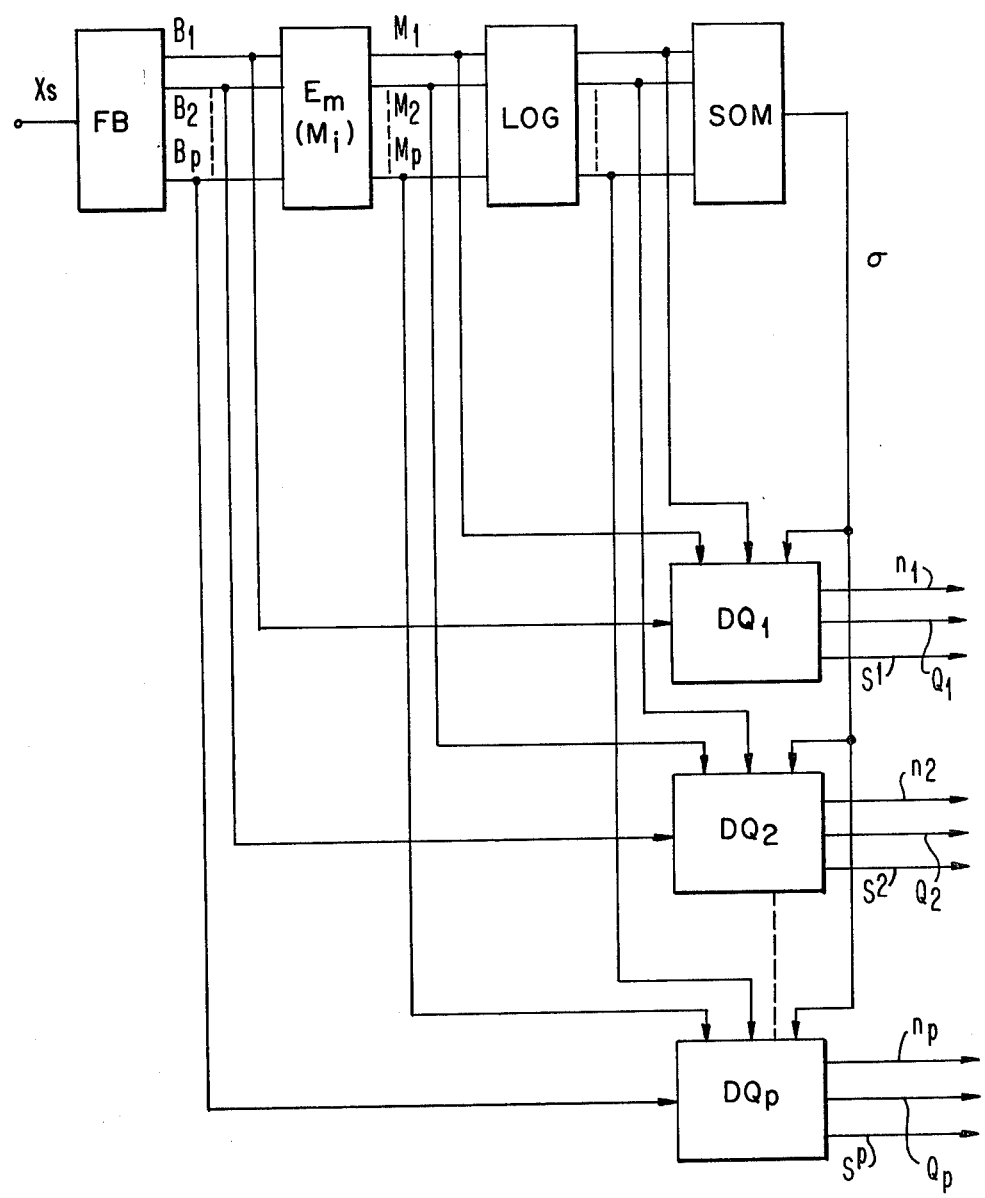
FIG. 1 is a block diagram of an embodiment of this invention.

Let S(nt) be the sampled signal to be coded and let us assume that its spectrum is split into p adjacent sub-bands which are quantized one by one, but in such a way that the total number of quantizing bits used for the p adjacent sub-bands is constant and equal to N. In a conventional coding system, all the sub-bands are quantized with N/P bits. This results in a quantization noise which may be reduced if one distributes the bit resources in a somewhat more rational way.

It was seen above how it is possible to accomplish this purpose when the spectral characteristics of the signal to be coded are statistically known. It is also obvious that such a specialized coder is inadequate for processing signals with variable or random spectral characteristics.

This invention provides a process very well suited for processing such signals. For understanding this process, it is assumed that the number of bits used to quantize the signal from S(nt) and contained in the $i^{th}$ sub-band bears reference $n_i$.

In addition, the energy in the same sub-band, before quantization, bears reference $E_i$. The quantization noise introduced into channel i, at first order, follows the following relation:

$$e_i = E_i \cdot 2^{-2n_i}$$

The mean quadratic error over all the p sub-bands is then equal to:

$$e = \sum_{i=1}^{p} E_i \cdot 2^{-2n_i}$$

and, in addition, one has: $\sum_{i=1}^{p} n_i = N$.

Therefore, the error e is a minimum when all the terms of the sum providing e are equal to each other. If one assumes that:

$$E_i \cdot 2^{-2n_i} = k \quad \text{where} \begin{pmatrix} k \text{ is a constant and} \\ i = 1, 2, 3, ..., p. \end{pmatrix}$$

one has:

$$n_i = -\log k^{\frac{1}{2}} + \log E_i^{\frac{1}{2}} \quad \text{where} \begin{pmatrix} \log \text{ indicates the} \\ \text{base 2 logarithm} \end{pmatrix}$$

$$n_i = \sigma + \log E_i^{\frac{1}{2}}$$

with $\sigma = -\log k^{\frac{1}{2}}$ $$N = \sum_{j=1}^{p} n_j = p\sigma + \log \prod_{j=1}^{p} E_j^{\frac{1}{2}}$$

from which $$\sigma = \frac{N - \log \prod_{j=1}^{p} E_j^{\frac{1}{2}}}{p}$$

where j is an index equal to 1, 2, 3, ... p and $\pi$ is a symbol used for indicating a product.

Therefore, the bit rate to be allocated to the quantization of the $i^{th}$ sub-band so as to minimize the overall quantization error over all the sub-bands, is as follows:

$$n_i = \frac{N - \log \prod_{j=1}^{p} E_j^{\frac{1}{2}}}{p} + \log E_i^{\frac{1}{2}} \quad (1)$$

Since $n_i$ indicates a number of bits, one need keep only an approximate integer value from the result of operation (1). Thus, one is provided with means based on the measurements of the energies contained in the various sub-bands, for rationally and dynamically distributing the quantizing bit resources.

To implement the invention, after having split the signal into p sub-bands, and measured the energy contained in each of them, one will then derive the number of bits to be allocated to the quantization of each sub-band, by applying formula (1), and then use this number to control the quantizer operation.

In practice, the adjustments of the quantizer are ensured for a given period of time; therefore, for a block of several samples. In this way, it is possible to determine the amplitude limits within which the signal varies during this period of time. From the comparison of these limits and from the allocated number of bits, one deduces the value of quantizing step Q to be chosen for the quantization of the related sub-band. For instance, if it is assumed that the amplitude of the $i^{th}$ sub-band varies between zero and ten volts and that the number of bits allocated to it is $n_i = 1$, a step $Q_i = 5$ volts would be chosen. This means that all the samples exceeding 5 volts will be coded by a "1" and the samples lower than 5 volts, by a "0", or conversely.

When the signal is split into sufficiently narrow sub-bands in the frequency domain, the spectrum in each channel is relatively flat. Let us then suppose that the energy in each sub-band is proportional to the square of the amplitude (modulus) of the largest sample (M) contained in the related sub-band. Then, one has:

$$E_i = \pi \cdot M_i^2 \quad (2)$$

$\lambda$ being a proportionality coefficient.

By combining expressions (1) and (2), one obtains:

$$n_i = \frac{1}{p} N - \log \prod_{j=1}^{p} M_j + \log M_i \quad (3)$$

It is unlikely that, starting from formula (3) and given an approximate integer value of the calculated result $n_i$, one obtains $$\sum_{i=1}^{p} n_i = N \quad (4)$$

But when the various values of $n_i$ for all the sub-bands are available, a readjustment of these values will be performed to satisfy expression (4). This readjustment is carried out by redistributing bits, i.e., by adding or subtracting bits into or from certain sub-bands $n_i$ as will be explained later on.

In addition, if digital circuits are used to carry out the quantizing operations of the invention, one has to process previously coded signals. This preliminary coding is carried out in a conventional way with a high bit rate to be accurate, then the device of the invention is used for requantizing the signal samples, which tends to reduce the overall number of bits used in all the sub-bands with a more rational distribution of the bits used.

The device shown on FIG. 1 is used for implementing the above-described quantizing process. The original signal S(nt) sampled and coded in PCM with a high bit rate, provides samples $X_S$ which are transmitted to a bank of filters FB. Said bank of filters splits the signal into p sub-bands $B_i$ containing samples $X^i$ (with i = 1, 2, ..., p). An energy measuring device $E_m$ sorts, on each sub-band, the samples it receives during a given period of time, so as to determine the largest of said samples (M). In other words, ($E_m$) determines values $M_j$ for j = 1, 2, ..., p. Then these values are applied to a logarithm generator LOG which may comprise a table in which the point coordinates of the function $y = 2^x$ are recorded, or a microprocessor the program of which allows the base two logarithm of $M_j$ to be calculated from an approximating convergent series. Then, values log $M_j$ are applied to an adder SOM which adds them to a gain factor 1/p and subtracts the result of this operation from a predetermined value N/p. Thus, SOM generates the term $\sigma$. At this time, one has all the information for quantizing the sub-bands.

Figure 2:
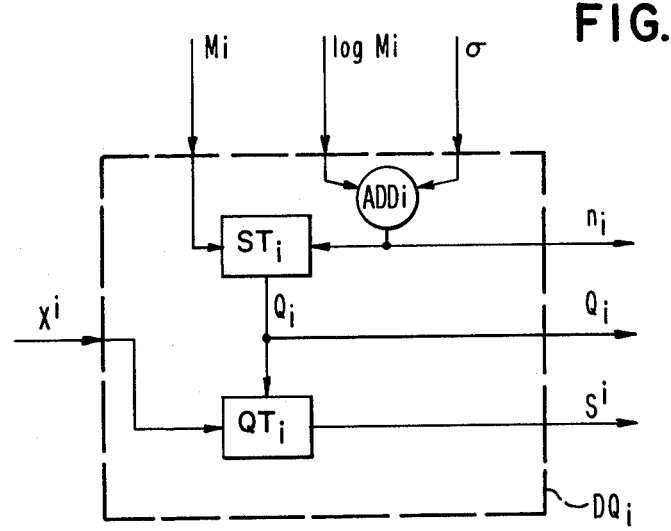
FIG. 2 illustrates in greater detail one of the elements shown in block form in FIG. 1.

To simplify the explanation, it is assumed here that each sub-band is quantized separately. $DQ_i$, one of the devices $DQ_1 - DQ_p$ for quantizing the $i^{th}$ sub-band and shown in greater detail in FIG. 2, includes: an adder ADDi, a quantizing step generator STi and a quantizer QTi. The addition of log $M_i$ and $\sigma$ in ADDi provides $n_i$, which is used in STi to generate quantizing step $Q_i$ by carrying out the following operation:

$$Q_i = M_i/2^{n_i-1} \qquad (5)$$

$Q_i$ is provided to quantizer Qti. The quantizer requantizes $X^i$ with $n_i$, thus generating a new digital sequence $S^i$.

If it is assumed, for instance, that $n_i = 1$, quantizing step then $$Q_i = M_i.$$

Device QTi performs a simple detection of the sign of $X^i$. When $X^i \geq 0$, QTi will provide $S^i = 1$ and when $X^i < 0$, it will provide $S^i = 0$.

Thus, the $X^i$'s initially coded in PCM with sixteen bits, for instance, are recoded with one bit.

As seen above, the use of the process of this invention requires the analysis of the sub-band contents over a predetermined period of time. Meanwhile, it is not deemed necessary to change $n_i$ and the quantizing step for each sample $X^i$. On the contrary, this process seems to be particularly suited for a coding operation performed by blocks of samples, of the so-called BCPCM type, which can be summed up as follows: for each block of K samples, a scale factor C is chosen such that the largest sample of the block does not fall outside the coding limits. Then the K samples of the block are quantized. The assembly comprised of the scale factor (or the block characteristic) and the K samples of the block, after quantization, provides all the digital information needed to define the block. For a more detailed description of this type of coding, one may refer to an article by A. Croisier relating to a lecture given at the 1974 International Seminar on Digital Communications in Zurich, Switzerland, and entitled, "Progress in PCM and Delta Modulation: Block Companded Coding of Speech Signal." In this invention, $n_i$ will be defined for the duration of each block.

The value of $M_i$ or an approximate value, can be chosen for $C_i$, in which case expression (3) becomes:

$$n_i = \frac{N - \log \prod_{j=1}^{p} C_j}{p} + \log C_i \qquad (6)$$

Of course, when the signal is decoded to recover the original information S(t), not only the $S^i$'s of each channel are necessary, but also the $C_i$'s. If this type of coder/decoder is used in the communication domain, it is possible to reduce the congestion in the channels by not transmitting the $n_i$'s since they can be recalculated at the receiver level, from formula (6). For all the p sub-bands, therefore, one transmits p values of $Q_i$, p values of $C_i$ and p.K values of the requantized signal samples for the overall p channels of the invention.

More bits can be saved by transmitting only the p.K sample values, the p values of $n_i$ and only one quantizing step value, as this will be explained with reference to another embodiment of this invention. For this example, K and p have been chosen to be respectively equal to 8 and 16; i = 1, 2, ..., 16 will indicate the index characterizing the corresponding sub-band or channel and j = 1, 2, ..., 8 will be the index defining the rank of each sample within its block. Notation $[X_j^i]$ provides, therefore, a complete definition of each of the 128 samples distributed over all the p sub-bands during a period of time corresponding to the duration of a block, i.e., sixteen times eight samples for the related example.

This coder is suitable for processing a signal within a frequency band under 4000 Hz, it is possible to sample S(t) at 8 kHz, which involves blocks of a duration of 128/8000 = 16 ms.

Figure 3:
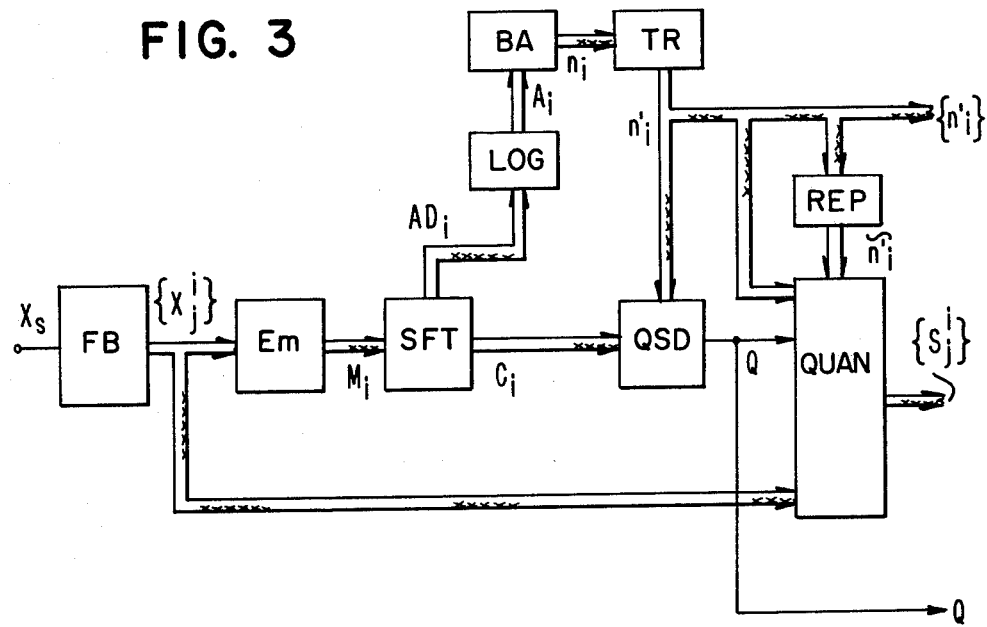
FIG. 3 is a block diagram of another embodiment of the invention.

As shown in FIG. 3, the input samples to be requantized are, here again, transmitted to a bank of filters FB. Said bank splits the initial signal into 16 sub-bands, the $M_i$'s of which are determined in $E_m$ by carrying out sorting operations. The $M_i$'s are defined by words of sixteen bits. Subsequently in the process, a table lookup is performed. To reduce the size of the memory used to store this table, the $M_i$'s are redefined by a table referenced by SFT and one takes advantage of this operation to derive the $C_i$'s.

The table SFT can include, for instance, $32 = 2^5$ values coded with 10 bits, which are distributed over the whole variation interval of the $M_i$'s. Each $M_i$ is rounded to the closest value amongst these 32 values. The operation can be performed by using five dichotomic tests, and provides a value $C_i$ coded with 10 bits and its address $AD_i$ coded with 5 bits in table SFT. These 5 bits are used for addressing a logarithm table LOG which provides $A_i = \log_2 C_i$. If $C_i$ falls within 1 and 1024, $0 \leq A_i \leq 10$. For $A_i$, a format including twelve bits has been adopted to define the logarithm of $C_i$, 8 bits of which are provided for the mantissa. The terms provided by LOG are transmitted to a device BA which computes $\sigma$ and $n_i$ via the following operations:

$$\sigma = \frac{1}{16}(N - \sum_{1}^{16} A^i)$$

and
$$n_i = \sigma + A_i$$
so that
$$\sum_{1}^{16} n_i = N.$$

Three bits were selected for the quantization of $n_i$, therefore, a truncating operation of $n_i$ will be performed in TR so that these terms will only take the values $n'_i$ coded between 000 and 111. These values of $n'_i$ are used to determine the quantizing step Q in QSD, which carries out the following operation $$Q = \frac{\sum_{i=1}^{r} C_i \cdot 2^{-n'_i + 1}}{r} \qquad (7)$$

where r is the number of sub-bands for which $n'_i \neq 0$, the sub-bands for which $n_i \neq 0$ are the only ones used, for computing expression (7).

In practice, it is possible to simplify the operations for determining Q by performing a summing operation on all the channels, which are used to determine Q by performing the following operation:

$$Q = \frac{\sum_{i=1}^{p} C_i \cdot 2^{-n'_i+1}}{p}$$

In addition, a study using a number of speakers has shown that the ratio between step $Q_i$ which could have been chosen for each sub-band and the mean step Q defined in (7), does not vary significantly from one speaker to another and is approximately equal to $\gamma = 0.6875$ (i.e. 11/16). By weighting the above determined quantizing step so as to obtain $Q' = 0.6875 Q$, the quantization signal-to-noise ratio is improved by 2dB, approximately.

In addition, $\sum_{i=1}^{16} n'_i$ will generally be different from $N$.

Then a bit resource residue ($\leq 0$) occurs, which is equal to $$N - \sum_{i=1}^{16} n'_i,$$

to be distributed over the 16 sub-bands. This function is assigned to device REP, the operating criteria of which vary as $N - \epsilon\, n'_i$ is positive or negative.

FIRST CASE $$N - \sum_{i=1}^{p} n'_i > 0:$$

The residual bits are distributed among the quantizers of the channels for which $n'_i = 0$, starting with the channels processing the lowest frequency sub-bands, and allocating only one additional bit to each channel.

SECOND CASE $$N - \sum_{i=1}^{p} n'_i < 0:$$

The bits in excess are subtracted from the channels, starting from the highest frequency sub-bands and subtracting only one bit from each channel.

Device REP implementing the above principles, transforms sequence $[n'_i]$ into a new sequence $[\tilde{n}'_i]$.

| | Example for N = 25 | | | |
| | $\Sigma n_i' = 22$ | | $\Sigma n_i' = 29$ | |
| i | $n_i'$ | $\tilde{n}_i'$ | $n_i'$ | $\tilde{n}_i'$ |
|---|---|---|---|---|
| 0 | 3 | 3 | 3 | 3 |
| 1 | 4 | 4 | 5 | 5 |
| 2 | 3 | 3 | 5 | 5 |
| 3 | 3 | 3 | 3 | 3 |
| 4 | 2 | 2 | 2 | 2 |
| 5 | 1 | 1 | 1 | 1 |
| 6 | 0 | 1 | 1 | 1 |
| 7 | 1 | 1 | 2 | 2 |
| 8 | 1 | 1 | 2 | 2 |
| 9 | 0 | 1 | 0 | 0 |
| 10 | 1 | 1 | 2 | 1 |
| 11 | 0 | 1 | 1 | 0 |
| 12 | 0 | 0 | 0 | 0 |
| 13 | 0 | 0 | 0 | 0 |
| 14 | 2 | 2 | 1 | 0 |
| 15 | 1 | 1 | 1 | 0 |

Therefore, sequences $[\tilde{n}'_i]$ are determined from sequence $[n'_i]$ are from N. They are useful to control the adjustment of the quantizer at the transmission end. In effect, for all the sub-bands for which $\tilde{n}'_i$ is different from $n'_i$, a readjustment of the quantizing step is to be carried out. More particularly, when $\tilde{n}'_i = n'_i + 1$, the corresponding sub-band must be quantized with a step divided by two. Therefore, values $[\tilde{n}'_i]$ are also used by the receiving decoder. But only sequences $[\tilde{n}'_i]$ will be transmitted, sequence $[n'_i]$ will be recomputed, if necessary at the receiver level, in accordance with the above-defined criteria.

The values of parameters Q and $\tilde{n}'_i$ are used to control the operation of quantizer QUANT itself, the input of which receives terms $[X^i_j]$. Its quantizing step is adjusted so that:

$$Q_i = Q \cdot 2^{n_i - \tilde{n}_i}.$$

In addition, when the sub-band to be processed is to be requantized with one bit ($\tilde{n}'_i = 1$), the performance of the device can be improved by multiplying $Q_i$ by a statistically determined factor $\alpha$. For $\alpha = 5/8 = 0.625$, a signal-to-noise ratio exceeding the one obtained for $\alpha = 1$, is obtained. This coefficient is provided to take into account the difference of quality which would have been obtained with a quantizing operation performed in the conventional one-bit BCPCM mode, i.e., by taking the mean value of the amplitudes of the samples of a same block as reference instead of the amplitude of the largest sample of that block.

Figure 4:
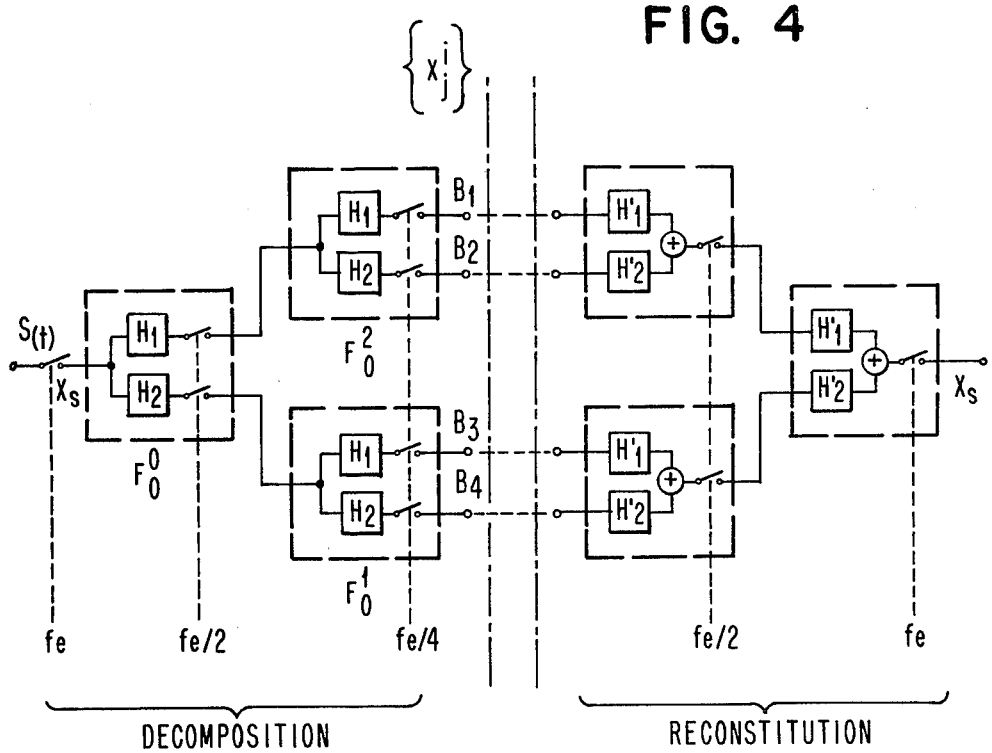
FIGS. 4 and 5 illustrate certain elements shown in block form in FIGS. 1 and 3.

The coding of this invention is based on a spectral decomposition carried out in FB (see FIGS. 1 and 3). Sampling the sub-bands to their Nyquist frequencies would allow the quantity of information to be kept constant. On the other hand, to ensure a flat overall response on the whole frequency bandwidth of signal $S(t)$, the transfer function of the filters splitting the signal into sub-bands, should cross each obther at $-3$dB. But this would lead to spectrum foldings due to the sampling and, consequently, also to crosstalks between the sub-bands. If to cancel these foldings one uses a bank of very steep filters intersecting at $-20$dB approximately, an undesirable echo phenomenon appears. All these disadvantages can be avoided by using a bank of filters canceling said spectrum foldings appearing when carrying out the sampling operation. For this purpose, a tree structure of the type described in the IBM Technical Disclosure Bulletin, Vol. 19, No. 9, February 1977, pages 3438 and 3439 can be used. As shown in FIG. 4 of this application, each element $Fo^0$, $Fo^1$, $Fo^2$ of the tree includes two half-band filters in quadrature ($H_1$ and $H_2$) and switches for taking only every other sample from each output of said filters. Therefore, if fe indicates the sampling frequency at filter FB input, this frequency becomes fe/2, fe/4, etc., as one goes forward into the tree. Therefore, the total quantity of information remains constant in the tree structure whatever the number of steps used when carrying out the splitting operation may be and, therefore, whatever the number of sub-bands may be. If one chooses to operate on blocks of K samples at the input, a same total number of samples over all the sub-bands appears at the output. Half-band filters $H_1$ and $H_2$ can, in addition, be combined as shown in the above-cited article, to reduce the quantity of hardware required to build them.

When rebuilding the original signal, it is necessary to come back to the initial sampling frequency fe. This is carried out, as shown in FIG. 4 (in which it is assumed that $p = 4$ to simplify the explanation), by filtering the signals which have been obtained, through low-pass and high-pass half-band filters $H'_1$ and $H'_2$, respectively, and of the type described in the above cited IBM Technical Disclosure Bulletin, by adding the outputs of said filters, and by multiplying the sampling frequency by two when performing each filtering step. This last operation is performed by interleaving a null sample between two consecutive samples.

Figure 5:
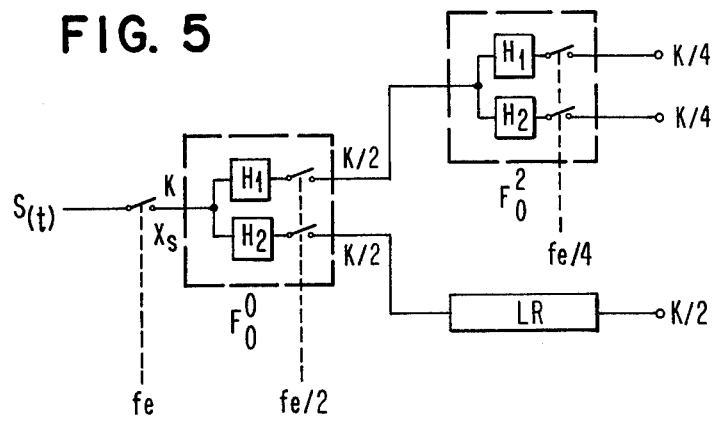

This structure is also particularly well suited if the spectrum is to be split into sub-bands of unequal widths. In effect, it is possible at the coder level to split the quantizing bits in an even more rational way, by splitting the signal spectrum into sub-bands of unequal widths. This can practically be performed by replacing the filters of certain branches of the tree structure shown in FIG. 4 by delay lines provided to compensate for the transit time of the filters included in the other sub-bands. FIG. 5 shows an example of such an embodiment. Sampled signal S(t) is split into two sub-bands by using filter set $Fo^0$. The high band provided by $Fo^0$ is applied to a delay line LR, while the low band is again split into two sub-bands in $Fo^2$. The sampling frequencies are reduced as for the device shown in FIG. 4. Therefore, during a sample block, one obtains K/4 samples at the output of each filter $H_1$ and $H_2$ of $Fo^2$ and K/2 samples at the output of the delay line.

The above-described tree structures can also be replaced by other well-known combinations of transversal filters which provide digitally equivalent results.

While the invention has been particularly shown and described with reference to preferred embodiments thereof, it will be understood by those skilled in the art that various changes in form and details may be made therein without departing from the spirit and scope of the invention.

What is claimed is:

1. A process for quantizing a signal, the spectrum of which extends over a given band of frequencies, characterized in that it includes the following steps:
    splitting the signal into p frequency sub-bands,
    measuring the energy (E) of the signal contained in each of the said sub-bands,
    determining the logarithm of each of said measured energies,
    determining the number of bits to be allocated for quantizing the log signal contained in each of said sub-bands so that it satisfies the following relation:

$$n_i = \frac{N - \log \prod_{j=1}^{p} E_j^{\frac{1}{2}}}{p} + \log E_i^{\frac{1}{2}}$$

where
    $n_i$ is the number of bits to be allocated for quantizing the samples of the $i^{th}$ sub-band, and
    N is the total number of bits to be allocated for quantizing the p sub-bands,
    using $n_i$ for controlling the adjustment of the quantizing step of the $i^{th}$ sub-band,
    quantizing the signal contained in each of said sub-bands.

2. The quantizing process according to claim 1 characterized in that said adjustment of the quantizing step is carried out for a predetermined duration of the signal to be quantized.

3. The quantizing process according to claim 2 characterized in that said signal is sampled, and that the value of the amplitude of the largest sample appearing in each of said sub-bands during said predetermined duration, is used as a factor for measuring said energy contained in each of said sub-bands.

4. A process for quantizing an initially sampled and PCM coded signal, characterized in that it includes the following steps:
    filtering the signal through a bank of filters extending over p sub-bands,
    measuring the largest sample in each of said sub-bands for a predetermined time interval,
    determining the number of bits to be allocated for quantizing the samples of each of said sub-bands for said time interval, so that it satisfies the following relation:

$$n_i = \frac{N - \log \prod_{j=1}^{p} M_j}{p} + \log M_i$$

where:
    the integer value of $n_i$ is the number of bits to be allocated to the $i^{th}$ sub-band,
    $M_i$ is the largest sample of the $i^{th}$ sub-band during said predetermined time interval,
    N is the overall bit resources to be distributed over the sub-bands,
    using $n_i$ to control the adjustment of the quantizing step of the $i^{th}$ sub-band,
    quantizing the signal contained in each of said sub-bands.

5. A quantizing process according to claim 4 applied for coding a signal into the BCPCM mode and characterized in that the measure of the largest sample of each sub-band is used to determine a scale factor characteristic C provided for coding the sample block of said sub-band and in that $n_i$ satisfies the following relation:

$$n_i = \frac{N - \log \prod_{j=1}^{p} C_j}{p} + \log C_i.$$

6. A quantizing process according to any one of claims 1-5, characterized in that said sub-bands have different bandwidths.

7. A device for quantizing a sampled signal extending over a given frequency bandwidth, characterized in that it includes:
    filtering means receiving an input signal and splitting said signal into p sub-bands,
    sorting means responsive to the filtering means for determining the largest sample contained in each sub-band, during a predetermined time interval,
    first means responsive to the sorting means for determining the logarithm of the value of each of said largest samples,
    second means, responsive to said first means, for determining the number of bits to be allocated for quantizing the signal contained in each of said sub-bands so that said number satisfies the following relation:

$$n_i = \frac{N - \log \prod_{j=1}^{p} M_j}{p} + \log M_i$$

where:
    $n_i$ is the number of bits to be allocated to the $i^{th}$ channel,
    N is the total bit resources to be distributed on the sub-bands, and
    $M_i$ is the largest sample contained in the $i^{th}$ sub-band during said predetermined time interval, means responsive to said sorting means and said second means for providing a quantizing value Q for each of said sub-bands, so that:

$$Q_i = M_i \cdot 2^{-n_i+1}$$

wherein: $Q_i$ is the quantizing step of the $i^{th}$ sub-band, and
quantizing means responsive to the outputs of said filtering means and to the quantizing value for providing a requantized value of the signal samples.

8. A device for quantizing an initially sampled and PCM coded signal, provided for a coder of the BCPCM type and characterized in that it includes:
an input,
means for applying said signal coded in PCM mode, by blocks of K samples, to said input,
filtering means connected to said input and splitting the frequency band to be processed into p sub-bands,
sorting means connected to the outputs of said filtering means and determining the value of the largest sample contained in each sub-band within the duration of a block,
first means connected to the outputs of said sorting means for determining the value of a characteristic C provided for coding each sub-band in the BCPCM mode and a function thereof,
second means including a logarithm table responsive to a function of said characteristic C for providing the logarithms of said characteristics,
third means responsive to said second means for determining the number of bits n to be allocated for quantizing each of the sub-bands so that said number satisfies the following relation:

$$n_i = \frac{1}{p}\left[N - \sum_{j=1}^{p} \log C_j\right] + \log C_i$$

wherein: the integer value of $n_i$ is the number of bits allocated to the $i^{th}$ sub-band,
N is the overall bit resource for all the p sub-bands, and
$C_i$ is the coding characteristic of the $i^{th}$ sub-band,
fourth means responsive to said first and third means for determining a quantizing step:

$$Q = \frac{\sum_{i=1}^{r} C_i \cdot 2^{-n_i+1}}{r}$$

wherein:
r is the number of sub-bands for which $n_i$ is different from zero, and by making $C_i = 0$ for the sub-bands for which $n_i = 0$,
fifth means responsive to the third means for determining the residual bits resulting from the comparison of:

$$\sum_{i=1}^{p} n_i \text{ and } N$$

and for distributing said residual bits so as to define new quantizing bit rates $\tilde{n}_i$ and new quantizing steps $Q_i$, with $$Q_i = Q \cdot 2^{n_i - \tilde{n}_i}, \text{ and}$$

quantizing means responsive to said fifth means and the filter outputs for quantizing the outputs of said filtering means.

9. A device according to claim 8, characterized in that said fourth means for determining quantizing step Q, carries out the following operation $$Q = \frac{\sum_{i=1}^{p} C_i \cdot 2^{-n_i+1}}{p}$$

10. A quantizing device according to claim 8 characterized in that said third means includes means for truncating and rounding the values of $n_i$ in order to code them by using a given number of bits.

11. In a transmission system, a BCPCM coder of the type using a quantizing device according to claim 8, 9 or 10 and further includes means for transmitting the values of $n_i$, the quantizing bits of the samples and the value of quantizing step Q, to said transmission system.

12. A quantizing device according to claim 7, 8 or 9, characterized in that the quantizing step provided by said fourth means is multiplied by a statistically predetermined weighting coefficient.

* * * * *